(12) United States Patent
Gelenbe et al.

(10) Patent No.: US 9,473,354 B2
(45) Date of Patent: Oct. 18, 2016

(54) ASSIGNING RESOURCES TO RESOURCE-UTILISING ENTITIES

(75) Inventors: Sami Erol Gelenbe, London (GB); Stelios Timotheou, Nicosia (CY)

(73) Assignee: BAE SYSTEMS PLC, London (GB)

( * ) Notice: Subject to any disclaimer, the term of this patent is extended or adjusted under 35 U.S.C. 154(b) by 223 days.

(21) Appl. No.: 13/702,782

(22) PCT Filed: Sep. 1, 2011

(86) PCT No.: PCT/GB2011/051640
§ 371 (c)(1),
(2), (4) Date: Dec. 7, 2012

(87) PCT Pub. No.: WO2012/032331
PCT Pub. Date: Mar. 15, 2012

(65) Prior Publication Data
US 2013/0077496 A1 Mar. 28, 2013

(30) Foreign Application Priority Data

Sep. 7, 2010 (EP) ..................................... 10275091
Sep. 7, 2010 (GB) ..................................... 1014812.0

(51) Int. Cl.
*H04L 12/24* (2006.01)
*H04L 12/721* (2013.01)

(52) U.S. Cl.
CPC ......... *H04L 41/0826* (2013.01); *H04L 45/123* (2013.01); *H04L 45/38* (2013.01)

(58) Field of Classification Search
CPC .. H04L 41/0826; H04L 45/123; H04L 45/38
USPC ........................................ 370/280, 351, 241
See application file for complete search history.

(56) References Cited

U.S. PATENT DOCUMENTS

| | | | | |
|---|---|---|---|---|
| 5,481,604 A | * | 1/1996 | Minot | ....................... 379/114.01 |
| 6,314,465 B1 | * | 11/2001 | Paul | .................... H04L 67/1008 |
| | | | | 709/217 |
| 6,341,266 B1 | * | 1/2002 | Braun | .......................... 705/7.26 |
| 6,415,396 B1 | * | 7/2002 | Singh | .................. G06F 11/3688 |
| | | | | 714/25 |

(Continued)

OTHER PUBLICATIONS

Resource-Optimal Scheduling Using Priced Timed Automata (J.I. Rasmussen, K.G.Larsen and K. Subramani; Dept of computer science, Aalbord university, Denmark).*

(Continued)

*Primary Examiner* — Andrew Lai
*Assistant Examiner* — Mahmudul Hasan
(74) *Attorney, Agent, or Firm* — Maine Cernota & Rardin

(57) ABSTRACT

A method of assigning a resource from amongst a plurality of resources to a resource-utilizing entity from amongst a plurality of resource-utilizing entities, wherein a resource-to-resource-utilizing entity assignment has an associated cost. The method includes computing network flow costs of assignments for assigning resources to the resource-utilizing entities. The method constructs a flow network including source nodes corresponding to the resources, transhipment nodes corresponding to the assignments and a demand node, the flow network having arcs representing flow between the nodes, each arc having an associated network flow cost. The method then solves a Minimum Cost Flow problem for the flow network with negated arc costs to obtain flow values for the assignments, and assigns a resource to a resource-utilizing entity dependent on the flow value obtained.

15 Claims, 2 Drawing Sheets

(56) References Cited

U.S. PATENT DOCUMENTS

| | | | | |
|---|---|---|---|---|
| 6,804,201 | B1* | 10/2004 | Gelenbe | H04L 45/02 370/255 |
| 6,804,634 | B1* | 10/2004 | Holzmann et al. | 703/2 |
| 6,952,682 | B1* | 10/2005 | Wellman | G06Q 30/08 705/1.1 |
| 7,397,761 | B2* | 7/2008 | Kar | H04L 45/08 370/216 |
| 8,531,978 | B2* | 9/2013 | McReynolds | H04L 43/0876 370/217 |
| 2002/0038360 | A1* | 3/2002 | Andrews et al. | 709/223 |
| 2002/0198995 | A1* | 12/2002 | Liu et al. | 709/226 |
| 2003/0058798 | A1* | 3/2003 | Fleischer | H04L 45/00 370/238 |
| 2004/0015459 | A1* | 1/2004 | Jaeger | G06N 3/08 706/15 |
| 2005/0166163 | A1* | 7/2005 | Chang et al. | 715/863 |
| 2005/0166169 | A1* | 7/2005 | Kurzum et al. | 716/10 |
| 2006/0136428 | A1* | 6/2006 | Syeda-Mahmood | G06F 17/30286 |
| 2006/0241990 | A1* | 10/2006 | Sun et al. | 705/8 |
| 2008/0221967 | A1* | 9/2008 | Jensen | G06Q 10/06 705/7.31 |
| 2008/0271036 | A1* | 10/2008 | Bansal | G06F 9/5061 718/104 |
| 2009/0003211 | A1* | 1/2009 | Akyamac et al. | 370/235 |
| 2009/0138312 | A1* | 5/2009 | Moll | G06Q 10/06 705/7.12 |
| 2010/0100414 | A1* | 4/2010 | Lin | G06Q 30/02 705/14.43 |
| 2010/0106605 | A1* | 4/2010 | Lin | G06Q 10/02 705/14.73 |
| 2012/0000349 | A1* | 1/2012 | Couronneau | F41G 3/04 89/1.11 |
| 2012/0036023 | A1* | 2/2012 | Das et al. | 705/14.71 |

OTHER PUBLICATIONS

Solving Minimum-Cost Flow Problems by Successive Approximation Andrew V. GoldbergLaboratory for Computer Science Massachusetts Institute of Technology.Cambridge MA 02139. Robert E. Tarjanf Department of Computer SciencePrinceton UniversityPrinceton, N J 08544 and AT&T Bell Laboratories Murray Hill, NJ 07974. Published 1987.*

Network Methods.S1 Pure Minimum Cost Flow Operations Research Models and Methods Paul A. Jensen and Jonathan F. Bard.*

Asset-task assignment algorithms in the presence of execution uncertainty Stelios Timotheou.*

Resource-Optimal Scheduling Using Priced Timed Automata (J.I. Rasmussen, K.G.Larsen and K. Subramani; Dept of computer science, Aalbord university, Denmark).*

Resource-Optimal Scheduling Using Priced Timed Automata; J.I. Rasmussen 1 , K.C. Larsen 1 , and K. Subramani2 1 Department of Computer Science, Aalborg University, Denmark, {illum,kgl} © cs.auc.dk; Department of Computer Science and Electrical Engineering, West Virginia.University. USA, ksmani © csee.wvu.edu; Published 2004.*

Solving Minimum-Cost Flow Problems by Successive Approximation; Andrew Goldberg, Robert Tarjan and AT&T Bell laboratories.*

The Random Neural Network: A survey, Stelios Timotheou, The computer Journal Advance Access published Apr. 30, 2009.*

Notification Concerning Transmittal of International Preliminary Report on Patentability (Forms PCT/IB/326 and PCT/IB/373) and the Written Opinion the the International Searching Authority (Form PCT/ISA 237) dated Mar. 21, 2013, issued in corresponding International Application No. PCT/GB2011/051640. (8 pgs.).

Timotheou, Stelios. "The Random Neural Network: A Survey." The Computer Journal 00 (2009): 1-18.

Gelenbel, Erol, Stelios Timotheou, and David Nicholson. "Fast Distributed Near-Optimum Assignment of Assets to Tasks." (2010): 1.

Manne, Alan S. "A Target Assignment Problem." Cowles Foundation Discussion Paper No. 37 (1957): 1-8.

International Search Report (PCT/ISA/210) issued on Sep. 29, 2011, by the Great Britain Patent Office as the International Searching Authority for International Application No. PCT/GB2011/051640.

Written Opinion (PCT/ISA/237) issued on Sep. 29, 2012, by the Great Britain Patent Office as the International Searching Authority for International Application No. PCT/GB2011/051640.

European Search Report issued on Nov. 22, 2010.

Great Britain Search Report issued on Dec. 16, 2010.

Rasmussen J. I. et al., "Resource-Optimal Scheduling Using Priced Timed Automata", Mar. 9, 2004, Tools and Algorithms for the Construction and analysis of Systems; pp. 220-235.

* cited by examiner

ASSIGNING RESOURCES TO RESOURCE-UTILISING ENTITIES

The present invention relates generally to assigning resources to resource-utilising entities.

FIG. 1 shows a communications network 10 comprising a set of data links 12 for transferring data between nodes 14. The Figure also schematically illustrates a plurality of data items (D1, D2, D3 in the example) that are to be transferred over the data links to one or more nodes. It will be understood that the network and data items can take various forms, e.g. the data links may be physical components, wireless channels, etc, and the data items may be packets or any other transferrable arrangement of data.

The capacity/transfer ability to of each data link is limited. In a simple case, each link may only be able to transfer one data item at any one time period/slot. Using each data link may have an associated cost, which may be expressed in various ways, e.g. in terms of transfer of other data items being delayed or noise level. Further, if a data item is not allocated a data link then there can also be a cost. Thus, it is desirable to allocate data links for transferring the data items in a cost-effective manner. An objective is to make assignments that reduce/minimise the total expected cost.

Other examples of the general technical problem of assigning resources to entities include assigning transportation means to transportable items, or assigning weapon resources to targets. In these applications too, it is desirable to provide a good solution to the problem of resource assignment, which may be based on reducing/minimising various cost factors.

Embodiments of the present invention are intended to address at least some of the problems discussed above. Embodiments can result in efficient computation of an assignment solution.

According to a first aspect of the present invention there is provided a method of assigning a resource from amongst a plurality of resources to a resource-utilising entity from amongst a plurality of resource-utilising entities, wherein a resource-to-resource-utilising entity assignment has an associated cost, the method including:

computing network flow costs ($C_f$) of resource-to-entity assignments for assigning said resources to said entities;

constructing/updating a flow network including source nodes corresponding to the resources, transshipment nodes corresponding to the assignments and a demand node, the flow network having arcs representing flows between the nodes, each said arc having an associated said network flow cost ($C_f$);

solving a Minimum Cost Flow problem for the flow network with negated arc costs to obtain flow values ($X_f$) for the assignments, and assigning a said resource to a said entity dependent on the flow value obtained for a said assignment associated with that resource.

The step of computing the network flow costs ($C_f$) can include computing the network flow costs for assignments satisfying an equation:

$$C_f(a, t^{(m_t+1)}) = \max\{0, U(t)\Pi_{m=1}^{m_t} p_f(a_{\pi(m)}, t)p_s(a, t) - C_a(a, t)\} \quad (3)$$

where variables in the equation are as defined herein.

In some embodiments, the equation variables can be as follows:

a represents an asset/resource;

$t^{(m_t)}$ represents a said transhipment node in the flow network denoting a myth assignment to entity t;

U(t) represents a penalty cost U(t) if an entity t is not properly served by a resource;

$p_f(a, t)$ represents a probability that a resource a will fail in properly serving an entity t when assigned to it;

$C_a(a, t)$ represents a cost for assigning a resource a to an entity t.

The step of computing the network flow costs ($C_f$) can include computing the network flow costs in accordance with at least one arc cost approximation scheme. The arc cost approximation scheme may include a Random Neural Network approximation scheme.

The flow network may be configured so that a solution resulting from the solving of the Minimum Cost Flow problem for the flow network will be binary. The flow network may be configured so that the arc capacities and supplies/demands of the nodes are 0 or 1. The assigning of a said resource to a said entity may be made if the flow value obtained for the assignment associated with that resource is equal to 1.

A said source node a in the flow network may be connected to a plurality of said transshipment nodes $t^{(m_t)}$ via said arcs. A capacity of the arcs between the source node and the transshipment nodes can be equal to 1 (so that associated flows $X_f(a, t^{(m_t)})$ represent the fact that a said resource a is an $m_t$th assignment to a said entity t). Thus, the flow network may be configured so that at most one said resource node can be assigned to a said transshipment node. Each said transshipment node may only have one said arc leaving towards the demand node d and the arc may also have a capacity of 1.

The method may further include storing and/or displaying electronic data representing the assignment(s).

The method may further including updating task costs following the assignments.

According to an alternative aspect of the present invention there is provided a method of assigning an asset from amongst a plurality of assets to a task from amongst a plurality of tasks, the method including:

computing network flow costs ($C_f$) for assigning said assets to said tasks in accordance with a Random Neural Network-based arc cost approximation scheme.

According to another aspect of the invention there is provided a method of assigning a data transfer link from amongst a plurality of links to a data item from amongst a plurality of data items based on a technique substantially as described herein. A data link-to-data item assignment can have an associated cost. The method may include:

computing network flow costs ($C_f$) of assignments for assigning said data links to a said data item;

constructing/updating a flow network including source nodes representing the data links, transhipment nodes representing possible data item assignments and a demand node, the flow network having arcs representing flow from a said source node to a said demand node, each said arc having an associated said network flow cost ($C_f$);

solving a Minimum Cost Flow problem for the flow network with negated arc costs to obtain flow values ($X_f$) for the assignments, and assigning a said data link to a said data item dependent on the flow value obtained for a said assignment associated with that data link.

According to another aspect of the invention there is provided a method of assigning a transportation means from amongst a plurality of transportation means to a transportable item (load) from amongst a plurality of transportable items based on a technique substantially as described herein.

A transportation means-to-transportable item assignment can have an associated cost. The method may include:

computing network flow costs ($C_f$) of assignments for assigning said transportation means to a said transportable items;

constructing/updating a flow network including source nodes representing the transportation means, transhipment nodes representing possible transportable item assignments and a demand node, the flow network having arcs representing flow from a said source node to a said demand node, each said arc having an associated said network flow cost ($C_f$);

solving a Minimum Cost Flow problem for the flow network with negated arc costs to obtain flow values ($X_f$) for the assignments, and assigning a said transportation means to a said transportable item dependent on the flow value obtained for a said assignment associated with that transportation means.

According to another aspect of the present invention there is provided a method of assigning a weapon from amongst a plurality of weapons to a target from amongst a plurality of targets, wherein a weapon-to-target assignment has an associated cost, the method including:

computing network flow costs ($C_f$) of weapon-to-target assignments for assigning said weapons to said targets;

constructing/updating a flow network including source nodes corresponding to the weapons, transhipment nodes corresponding to the weapon-to-target assignments and a demand node, the flow network having arcs representing flows between the nodes, each said arc having an associated said network flow cost ($C_f$);

solving a Minimum Cost Flow problem for the flow network with negated arc costs to obtain flow values ($X_f$) for the weapon-to-target assignments, and assigning a said weapon to a said target dependent on the flow value obtained for a said weapon-to-target assignment associated with that weapon.

According to other aspects of the present invention there are provided systems configured to execute methods substantially as described herein.

According to other aspects of the present invention there are provided computer program products comprising computer readable medium, having thereon computer program code means, when the program code is loaded, to make the computer execute methods substantially as described herein.

The term "resource" used herein generally refers to an asset and may be any kind of resource that can be assigned for any kind of technical utilisation. A resource may be a physical entity, such as a piece of machinery or vehicle, or it may be an electronic resource, such as computer memory or capacity in a data transfer link in a communications network. A resource-utilisation entity may be a physical entity, such as an item to be transported, or it may comprise a task that requires a resource in order to be performed, e.g. a computing task that requires a computing resource, such as processor time. Further, it should be understood that references to "data link" and "data item" in the example embodiment and associated statements of invention are intended to be interchangeable with other terms, such as "transportation means/weapon" and "transportable item/target", respectively.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
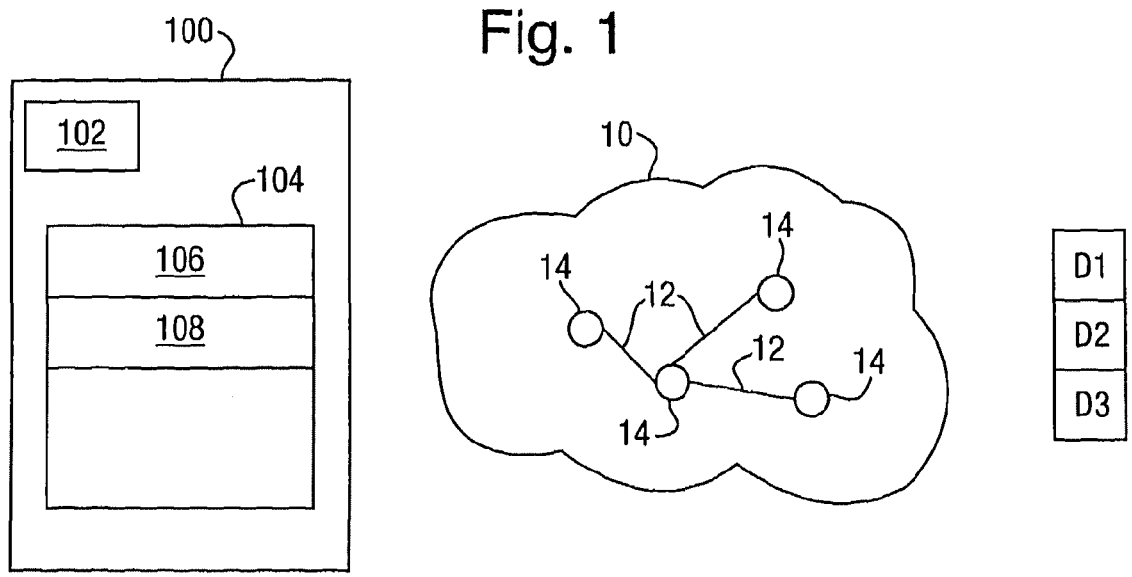
FIG. 1 is a schematic diagram of a plurality of data links and data items and a system configured to assign data links to the data items.

Referring to FIG. 1 again, the example problem posed is which data link(s) to assign to which of the data items. The Figure shows a system 100 configured to perform such assignments. It will be understood that the system can take any suitable form, e.g. a personal computer or distributed computing system, and can include conventional communications interfaces, user interfaces, etc. It may be located remote from the network comprising the data links. The system may directly or indirectly control the data link hardware in accordance with the assignment, or may produce an output describing the assignment for use by one or more human operators or another software application. The system can include a computing device having a processor 102 and a memory 104. The memory 104 can include data 106 relating to the data items, data links and/or other factors, as well as instructions 108 that the computing device can execute to perform the assignments.

Data can be produced describing characteristics of each data link, e.g. speed, capacity, etc. It will be appreciated that the number, types and characteristics of the resources described herein are exemplary only. Data specifying characteristics of each data item can also be produced. For instance, each data item may have associated with it, e.g. size, desired delivery time/date, priority, etc. These costs may be determined by human assessors, or may at least be partially retrieved from a data store or automatically calculated based on known information about at least some of the data items.

Embodiments of the invention use flow network techniques to generate the assignments, which are based on solving a sequence of minimum cost flow problems on appropriately constructed networks with estimated arc costs. In general terms, the system can assign resources to entities which use the resources, where each resource can potentially serve any of the entities, but resources serve the entities with a probabilistic outcome of success (execution uncertainty). In specific embodiments the resources comprise data links and the entities comprise data items which are to be transferred over the data links, but it will be appreciated that the system could be modified to generate assignments for different types of applications, e.g. allocating transportation means for transporting items, or assigning weapons to targets. The skilled person can modify the data link assignment example given herein for solving such alternative problems. In specific cases there can be a cost associated with each possible assignment of a resource to an entity, and if an entity is not served by a resource there is also a cost.

An objective in such cases is to make assignments to minimise the total expected cost.

Some formal definitions will now be given. A set of tasks T (a specific type of exemplary resource-utilising entities) need to be executed by a set of resources/assets A. Task t carries a penalty $U(t)$ if it is not executed by an asset, while there is also a cost $C_a(a, t)$ for assigning asset a to task t. It is assumed that any task can be executed by any asset and that any one of the assets suffices to execute any one of the tasks. It is also possible that the task execution may fail despite the fact that an asset has been assigned to it, and this is represented by the probability $0 \leq p_f(a, t) \leq 1$ that asset a will fail in executing task t when it is assigned to it. To compensate task execution failures and to account for the fact that the incurred assignment cost can increase the overall cost, any number of assets (0–|A|) can be assigned to one task. Another assumption is that the assets assigned to a particular task have an independent effect, so that the total failure probability for the particular task is given by the product of the failure probabilities of the assets assigned to it. The problem can be formulated as equation (1) below:

$$\min C = \sum_{t \in T} \sum_{a \in \mathcal{A}} C_a(a, t) X(a, t) + \sum_{t \in T} U(t) \prod_{a \in \mathcal{A}} p_f(a, t)^{X(a,t)} \quad (1)$$

$$\text{s.t.} \sum_{t \in T} X(a, t) < 1, \quad a \in \mathcal{A}$$

$$X(a, t) \in \{0, 1\}$$

where the decision variables $X(a, t)$ show whether asset a is assigned to task t. The specific problem belongs to the general class of nonlinear assignment problems.

Specific embodiments provide schemes for the approximate solution of problem (1) above, and are based on solving a sequence of Minimum Cost Flow (MCF) problems with arc costs associated with the examined problem. Formally, the MCF problem considers a directed graph or network G=(N, E) which consists of a set of vertices or nodes N and a set of directed edges or arcs E connecting the nodes. Each arc $(i,j) \in E$ is characterised by two parameters: the capacity $u(i, j)$ of the particular arc which is the upper bound of flow $X_f(i, j)$ allowed through $(i, j)$ and an associated cost per unit of flow $C_f(i, j)$. Each node $i \in N$ has a supply $s(i)$ that is interpreted as the amount of flow that enters the node from the outside. Node i is a source or supply node if $s(i)>0$, a sink or demand node if $s(i)<0$ and a transshipment node if $s(i)=0$. Flow networks are governed by the flow conservation constraint, which states that at each node the incoming and outgoing flows are equal. Note that the conservation constraint can hold only if $\Sigma_i s(i)=0$. An objective is to find the cheapest flows that satisfy the nodes' supply, under the flow conservation and capacity constraints:

$$\min \Sigma_{(i,j) \in \epsilon} C_f(i,j) X_f(i,j) \quad (2a)$$

$$\text{s.t.} s(i) + \Sigma_{j:(j,i) \in \epsilon} X_f(j,i) = \Sigma_{j:(i,j) \in \epsilon} X_f(i,j), \forall i \in \mathcal{N} \quad (2b)$$

$$0 \leq X_f(i,j) \leq u(i,j), (i,j) \in \epsilon \quad (2c)$$

Figure 2:
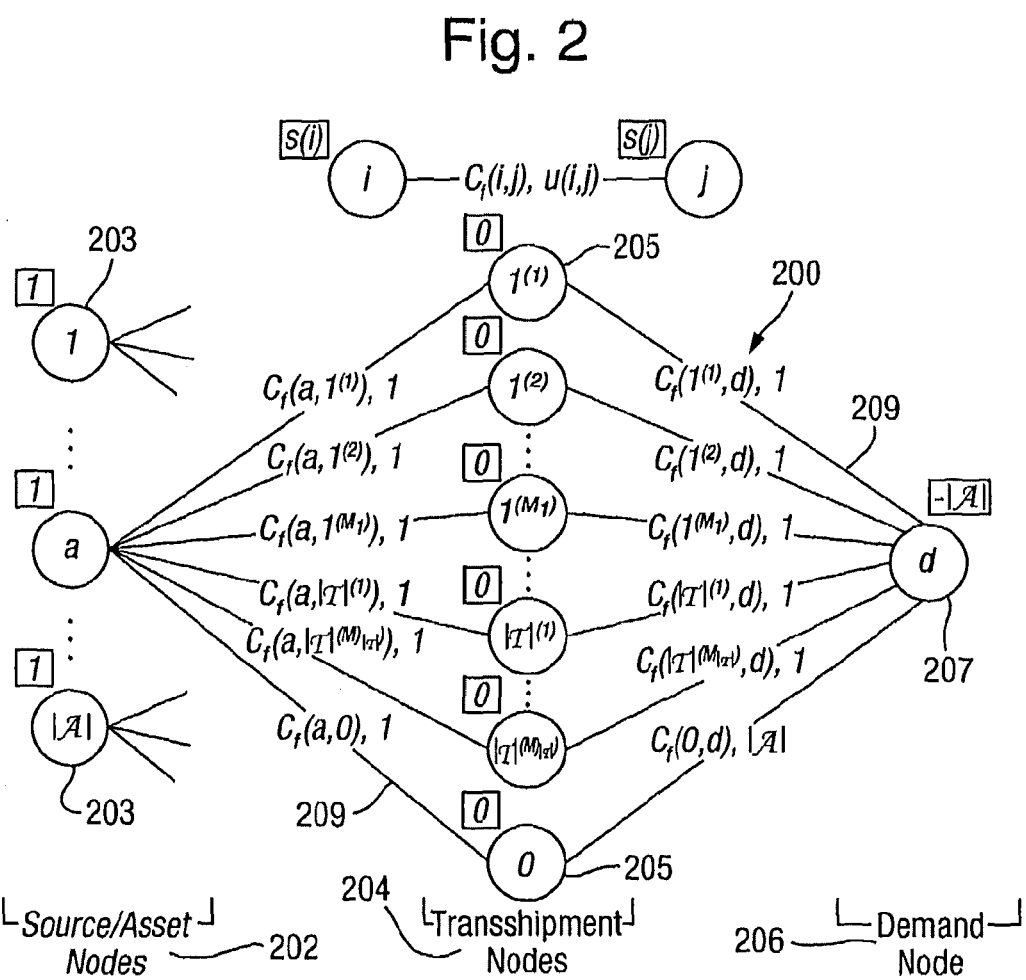
FIG. 2 is a schematic diagram of a flow network for use in solving the assignment problem.

FIG. 2 depicts a network 200 used for the solution of problem (1) above. The network comprises three layers of nodes: the first layer 202 contains the source nodes 203, the second layer 204 contains the transsshipment nodes 205 and the third layer 206 the demand node 207 that aggregates the flows send by the source nodes. Each source node a has supply $s(a)=1$ and corresponds to asset a. Each transshipment node $t^{(m_t)}$ denotes the $m_t$th asset assignment to task t, while node 0 corresponds to the case that an asset is not assigned to any task. At most $M_t$ assets can be assigned to task t. The role of the demand node d is to aggregate the flows send in the network and its demand is equal to the total supply of the assets, $s(d) = -|A|$.

A source node a is connected to all transsshipment nodes $t^{(m_t)}$ and the capacity of all arcs (209) is equal to 1, so that the associated flows $X_f(a, t^{(m_t)})$ represent the fact that asset a is the $m_t$th assignment to task t. Even though there are |A| arcs arriving at each transshipment node, there is only one arc leaving each such node towards the demand node d. These arcs also have capacity 1 except from the arc (0, d) whose capacity is equal to |A| so that even if no assignments are made the source nodes' supply reaches the demand node via node 0. Thus, flow $X_f(t^{(m_t)}, d)$, $t \in T$ denotes whether the $m_t$th assignment for task t has been made. The resulting configuration guarantees that at most one asset can be assigned to a particular transsshipment node. Moreover, as all arc capacities and supplies/demands of the nodes are 0 or 1, the integrality property guarantees that in the MCF solution all flows $X_f(a, t^{(m_t)})$ will be binary. We also need to ensure that the assignment of assets to a particular task t is contiguous. This ensures that $X_f(a, t^{(m_t)})$ can only be equal to 1 if $X_f(a, t^m)=1$ for all m=1, . . . , $m_t$−1.

The arc costs represent the net reduction in the cost function from assigning a particular asset to a task so our aim is to maximise the net reduction in the objective function. Thus, to solve the problem as a MCF problem all the costs associated with the network are negated.

Approximation of the arc costs is necessary because only the ones corresponding to first assignments $C_f(a,t^{(1)})$ are known and equal to $\max\{0, U(t)p_s(a, t) - C_a(a, t)\}$ for all a, t. To correctly determine the arc costs of the $(m_t+1)$th assignment, $m_t \geq 1$, the first $m_t$ assigned assets to task t $a_{t(1)}, \ldots, a_{t(m_t)}$ must be known. If an oracle provides this information $C_f(a, t^{(m_t+1)})$ would be:

$$C_f(a, t^{(m_t+1)}) = \max\{0, U(t) \Pi_{m=1}^{m_t} p_f(a_{t(m)}, t) p_s(a,t) - C_a(a,t)\} \quad (3)$$

Concerning the cost of the arcs towards node 0, it is taken that $C_f(a, 0) = \epsilon > 0$, $\forall$ a. As $\epsilon > 0$, it is possible to avoid unbounded solutions due to possible zero arc costs. At the same time the value of $\epsilon$ should be small enough so that it is never considered as a beneficial assignment. The arc costs from the transsshipment nodes to the demand node are all equal to zero; the role of those flows is to ensure that at most one asset is related to one task.

In practice, the asset assignments are not known beforehand and hence it is not possible to determine the cost values $C_f(a, t^{(m_t)})$, $m_t > 1$; for this reason approximation schemes have been developed. A conservative approach, called MCF-max, is to always assume that the previously assigned asset to a particular task is the least effective one i.e. the one with the largest execution failure probability $p_{f:max}(t) = \max_{a \in A} p_f(a, t)$. Hence, every term $p_f(a_{t(m)}, t)$, m=1, . . . , $m_t$ in Equation (3) above will be replaced by $p_{f:max}(t)$. An optimistic approach, called MCFmin, is to always consider the most effective asset for previous assignments. If $p_{f:min}(t) = \max_{a \in A} p_f(a, t)$ then we set $p_f(a_{t(m)}, t) = p_{f:min}(t)$. A third approximation scheme, called MCFrnn, is based on the Random Neural Network (RNN, see Timotheou, S.: The Random Neural Network: A Survey. The Computer Journal 53(3) (2010) 251-267). The approach can involve solving the problem using an RNN algorithm (see Gelenbe, E., Timotheou, S., Nicholson, D.: Fast distributed near optimum assignment of assets to tasks. The Computer Journal (2010)) and then using the derived allocations to obtain the arc costs for the MCF network. Hence, the terms $p_f(a_{t(m)}, t)$ are changed to $p_{f:rnn}(t_{(m)})$ which denote the execution failure probabilities for the mth asset assigned to task t. As the RNN algorithm is of low time complexity the overall execution time of the MCF approach is not significantly affected.

An important property of the described flow network is that because $0<p_f(a, t)<1$, it is true that: $C_f(a, t^{(1)}) > \ldots > C_f(a, t^{(mt)}) > C_f(a, 0) > 0$. The fact that this inequality does not include $C_f(a, t^{(Mt)})$ implies that $C_f(a, t^{(m)})=0$, $m=m_t+1, \ldots, M_t$, so that after the $m_t$th assignment asset a cannot be assigned to task t. This inequality also guarantees the contiguous property as the most beneficial assignment for every asset-task pair is always the first available.

Figure 3:
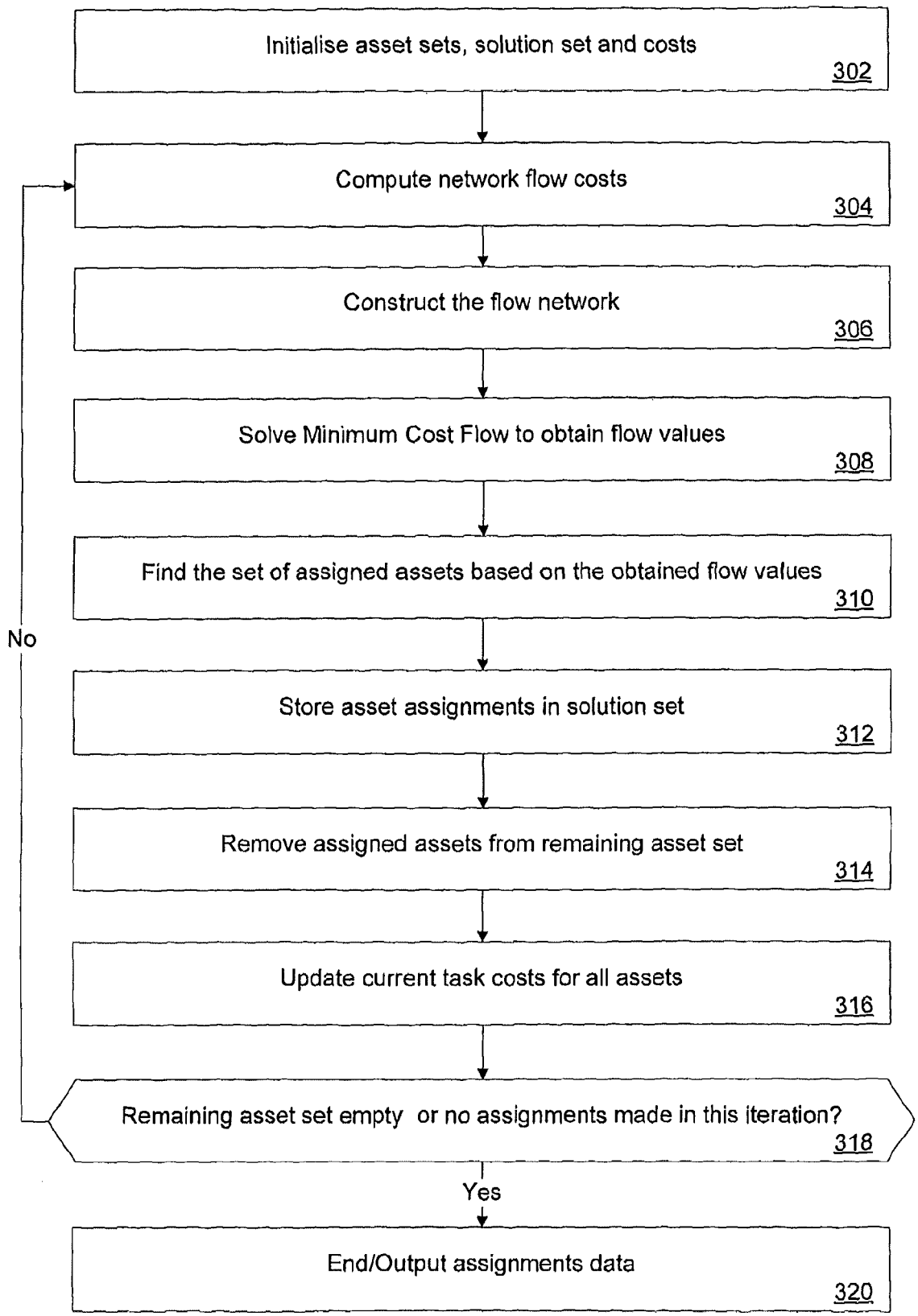
FIG. 3 is a flowchart showing steps that can be performed when generating assignments.

An example implementation of an MCF approach for the solution of problem (1) above is shown in the flowchart of FIG. 3. It will be appreciated that the steps shown are exemplary only and the skilled person will be able to implement the general principles using various data structures and programming techniques. Some of the steps shown may be omitted and/or re-ordered. For instance, the use of sets/data structures for temporarily storing data representing assignments is only an example implementation and alternative methods could be used.

At step 302 initialisation is performed. This can include setting a data structure ($A_{rem}$) used during execution of the algorithm to store a set of assets (e.g. data transfer links) that have not been so far been assigned to initially include all of the assets, and a solution set of assignment pairs (S) to empty. An array of variables ($U_{cur}(t)$) used to store the cost of not executing a task t (e.g. a data item to be transferred to particular destination) is initially set to the task costs U(t). Formally: initialise $A_{rem} \leftarrow A$, $S \leftarrow$ and $U_{cur}(t) \leftarrow U(t)$, $t \in T$.

At step 304 the network flow costs ($C_f$), all tasks t and all possible assignments according to equation (3) above and the desired approximation scheme (e.g. MCFmax, MCFmin or MCFrnn) for all remaining assets in $A_{rem}$ are computed. Formally: compute $C_f(a, t^{mt})$, $a \in A_{rem}$, $t \in T$ and $m_t=1, \ldots, M_t$ according to Eq. (3) and the desired cost approximation scheme.

At step 306 a flow network as shown in FIG. 1 is constructed for all assignments in the $A_{rem}$ set. Formally: construct flow network for $a \in A_{rem}$ and $t \in T$.

At step 308 the flow network is treated as an MCF problem that is solved, using the negated arc costs discussed above, to obtain the flow values $X_f(a, t^{(m)})$.

At step 310 the assets to be assigned are determined by selecting the network flows corresponding to first assignments computed at step 308 that have a value of 1. Formally: set $A_{ass} \leftarrow \{a:X_f(a, t^{(1)})=1, a \in A_{rem}, t \in T\}$.

At step 312 the assignments made at step 310 for this iteration are stored in the solution set. Formally: set $S_{cur} \leftarrow \{(a, t):X_f(a, t^{(1)})=1, a \in A_{rem}, t \in T\}$ and $S \leftarrow S \cup S_{cur}$.

At step 314 the assignments made at step 310 are removed from the set $A_{rem}$. Formally: set $A_{rem} \leftarrow A_{rem} \setminus A_{ass}$.

At step 316 the current task costs for all assets are updated by multiplying them with the failure probabilities of assignments pairs in $S_{cur}$ that have been assigned to a particular task t. Formally: $U_{cur}(t) \leftarrow U_{cur}(t) \prod_{a:(a;t) \in Scur} p_f(a, t)$, $t \in T$ At step 318 a question is asked whether the sets $A_{rem}$ and $A_{ass}$ are not empty (formally: if $A_{ass} \neq \emptyset$ and $A_{rem} \neq \emptyset$). If this is the case then control passes back to step 304, otherwise the process ends at step 320.

In the above steps, S is the solution set where the assignments made are stored, $A_{rem}$ denotes the set of the assets remaining to be assigned and $U_{cur}(t)$ is the cost of task t at the particular iteration.

The effectiveness of the proposed algorithms has been analysed by the inventors over two data families. In data family 1, the problem parameters were independently generated, while in data family 2 there was positive correlation between the cost of an assignment and its associated execution success probabilities, so that "better" assignments are more expensive. More details on the generation of the problem instances can be found in the "Fast distributed near optimum assignment of assets to tasks" reference above. Experiments for several (|A|, |T|) pairs with up to 200 assets and 100 tasks were performed. Due to the large size of the problems, the algorithms' performance was compared against tight lower bounds obtained by modifying an algorithm proposed for the WTA problem (see Manne, A.: A Target-Assignment Problem. Operations Research 6(3) (1958) 346-351). The performance measure used was the average relative percentage deviation from the lower bound, $\sigma_{LB}$:

$$\sigma_{LB}=100(N_{PI})^{-1}\Sigma_{i=1}^{NPI}(C_{alg,i} \ldots C_{LB,i})(C_{LB,i})^{-1}$$

where $C_{LB;i}$ is the cost obtained from the lower bounding algorithm and $N_{PI}$ is the total number of problem instances considered in each case.

$\sigma_{LB}$ for the various algorithms is reported in Tables 1 and 2 below:

TABLE 1

Average relative percentage deviation from the lower bound in data family 1

| |A| | |T| | |A|/|T| | RNN | MMR | MCFmax | MCFmin | MCFrnn | LBA |
| --- | --- | --- | --- | --- | --- | --- | --- | --- |
| 20 | 40 | 0.5 | 1.954 | 4.068 | 0.611 | 0.607 | 0.607 | 0.626 |
| 40 | 80 | 0.5 | 2.366 | 4.162 | 0.921 | 0.920 | 0.920 | 0.977 |
| 80 | 160 | 0.5 | 2.542 | 3.908 | 1.243 | 1.243 | 1.243 | 1.367 |
| 20 | 20 | 1.0 | 3.321 | 8.995 | 2.067 | 0.098 | 0.101 | 0.098 |
| 40 | 40 | 1.0 | 2.419 | 8.556 | 2.042 | 0.110 | 0.110 | 0.112 |
| 80 | 80 | 1.0 | 2.204 | 7.469 | 1.815 | 0.119 | 0.119 | 0.124 |
| 40 | 20 | 2.0 | 2.683 | 6.717 | 14.802 | 0.243 | 0.284 | 0.074 |
| 100 | 50 | 2.0 | 2.930 | 7.251 | 18.271 | 0.088 | 0.105 | 0.088 |
| 200 | 100 | 2.0 | 2.866 | 6.550 | 20.056 | 0.088 | 0.088 | 0.101 |
| Overall Perf. | | | 2.588 | 6.408 | 6.870 | 0.391 | 0.397 | 0.396 |

TABLE 2

Average relative percentage deviation from the lower bound in data family 2

| $|\mathcal{A}|$ | $|\mathcal{T}|$ | $|\mathcal{A}|/|\mathcal{T}|$ | RNN | MMR | MCFmax | MCFmin | MCFrnn | LBA |
|---|---|---|---|---|---|---|---|---|
| 20 | 40 | 0.5 | 0.486 | 0.540 | 0.486 | 0.486 | 0.486 | 0.527 |
| 40 | 80 | 0.5 | 0.505 | 0.561 | 0.509 | 0.508 | 0.508 | 0.553 |
| 80 | 160 | 0.5 | 0.684 | 0.740 | 0.683 | 0.683 | 0.683 | 0.751 |
| 20 | 20 | 1.0 | 0.708 | 3.031 | 0.765 | 1.577 | 0.589 | 0.094 |
| 40 | 40 | 1.0 | 0.673 | 3.384 | 0.822 | 1.710 | 0.652 | 0.140 |
| 80 | 80 | 1.0 | 0.777 | 3.719 | 1.007 | 1.826 | 0.806 | 0.518 |
| 40 | 20 | 2.0 | 2.619 | 3.428 | 5.980 | 3.149 | 3.039 | 0.077 |
| 100 | 50 | 2.0 | 2.382 | 3.393 | 6.441 | 3.429 | 3.307 | 0.580 |
| 200 | 100 | 2.0 | 2.115 | 3.298 | 6.333 | 3.533 | 3.320 | 1.213 |
| Overall Perf. | | | 1.217 | 2.455 | 2.558 | 1.878 | 1.488 | 0.4948 |

Column LBA corresponds to the cost of the original problem (1), computed using the solution obtained from the lower bounding algorithm. LBA is only considered to demonstrate the tightness of the lower bounds and is not compared with the other methods, as it is not of polynomial complexity.

For data family 1 the most effective algorithms were found to be the network flow approaches MCFmin and MCFrnn for all (|A|, |T|) pairs, which have almost the same efficiency and achieve $\sigma_{LB}<1.3\%$ in all cases. In addition, these algorithms outperform the LBA approach for the cases that $|A|/|T|\leq 1$. Additionally, MCFmax only performed well when $|A|/|T|\leq 1$. For data family 2 the best overall performing algorithm was found to be RNN. RNN performed better than the other approaches for large problem instances when |A|=|T| and 2|A|=|T|, while for the other problems its performance can be highly competitive. MCFrnn achieved better results than the MCFmin approach, especially for the problem sets with equal number of assets and tasks. The performance of the MMR approach was improved compared to data family 1 while the MCFmax was, again, found to be the least effective approach.

The invention claimed is:

1. A method of assigning a resource from amongst a plurality of resources to a resource-utilising entity from amongst a plurality of resource-utilising entities, wherein a resource-to-resource-utilising entity assignment has an associated cost, the method comprising:
   computing network flow costs of assignments for assigning said resources to said resource-utilising entities;
   constructing/updating a flow network including source nodes corresponding to the resources, transhipment nodes corresponding to the assignments and a demand node, the flow network having arcs representing flow between the nodes, each said arc having an associated said network flow cost;
   computing said network flow cost of each said arc in accordance with at least one arc cost approximation scheme, wherein the computing of the network flow costs comprises:
   computing the network flow costs ($C_f$) for assignments satisfying an equation:

$$C_f(a, t^{(m_t+1)}) = \max\left\{0, U(t)\prod_{m=1}^{m_t} p_f(a_{t(m)}, l)p_s(a, l) - C_a(a, t)\right\}$$

wherein:
a represents a resource from said plurality of resources;
$p_s(a,t)$=Probability that asset a successfully executes task t when it is assigned to it,
$a_{t(m)}$ represents an assigned resource for the $m_t$th transhipment node to entity t;
$t^{(m_t)}$ represents said transhipment node in the flow network denoting a $m_t$th assignment to entity t;
U(t) represents a penalty cost U(t) if an entity t is not properly served by a resource;
$p_f(a, t)$ represents a probability that said resource a will fail in properly serving an entity t when assigned to it; and
$C_a(a, t)$ represents a cost for assigning a resource a to an entity t;
solving a Minimum Cost Flow problem for the flow network with negated arc costs to obtain flow values for the assignments; and
assigning said resource to said resource-utilising entity dependent on the flow value obtained for said assignment associated with said resource.

2. The method according to claim 1, wherein the arc cost approximation scheme includes a Random Neural Network approximation scheme.

3. The method according to claim 1, wherein the flow network is configured so that a solution resulting from the solving of the Minimum Cost Flow problem for the flow network is binary.

4. The method according to claim 3, wherein the flow network is configured so that capacities of the arcs and supplies/demands of the nodes are either 0 or 1.

5. The method according to claim 4, wherein the assigning of said resource to a said resource-utilising entity is made if the flow value obtained for the assignment associated with that resource is equal to 1.

6. The method according to claim 5, wherein said source node a in the flow network is connected to a plurality of said transshipment nodes $t^{(mt)}$ via said arcs and a capacity of the arcs between the source node and the transshipment nodes is equal to 1.

7. The method according to claim 6, wherein the flow network is configured so that at most one said source node is assigned to said transshipment node.

8. The method according to claim 7, wherein each said transshipment node has one said arc leaving towards the demand node d, that arc having a capacity of 1.

9. The method according to claim 1, comprising: storing and/or displaying electronic data representing the assignment(s).

10. The method according to claim 1, comprising: controlling said resource to serve said resource-utilising entity according to said assignment.

11. A computer program product comprising a non-transitory computer readable medium, the computer readable medium having thereon computer program code that, when loaded into a computer, causes the computer to execute the method according to claim 1.

12. A computing system comprising: a processor and memory configured to execute a method of assigning a resource from amongst a plurality of resources to a resource-utilising entity from amongst a plurality of resource-utilising entities, wherein a resource-to-resource-utilising entity assignment has an associated cost, the method having:

computing network flow costs of assignments for assigning said resources to said resource-utilising entities in accordance with at least one arc cost approximation scheme, wherein the computing of the network flow costs comprises:

computing the network flow costs ($C_f$) for assignments satisfying an equation:

$$C_f(a, t^{(m_t+1)}) = \max\left\{0, U(t)\prod_{m=1}^{m_t} p_f(a_{t(m)}, l)p_s(a, l) - C_a(a, t)\right\}$$

wherein:

a represents a resource from said plurality of resources;

$p_s(a,t)$=Probability that asset a successfully executes task t when it is assigned to it, $a_{t(m)}$ represents an assigned resource for the $m_t$th transhipment node to entity t;

$t^{(m_t)}$ represents said transhipment node in the flow network denoting a $m_t$th assignment to entity t;

U(t) represents a penalty cost U(t) if an entity t is not properly served by a resource;

$p_f(a, t)$ represents a probability that said resource a will fail in properly serving an entity t when assigned to it; and $C_a(a, t)$ represents a cost for assigning a resource a to an entity t;

constructing/updating a flow network including source nodes corresponding to the resources, transhipment nodes corresponding to the assignments and a demand node, the flow network having arcs representing flow between the nodes, each said arc having an associated said network flow cost;

solving a Minimum Cost Flow problem for the flow network with negated arc costs to obtain flow values for the assignments; and assigning said resource to said resource-utilising entity dependent on the flow value obtained for said assignment associated with said resource.

13. A method of assigning a resource from amongst a plurality of resources to a resource-utilising entity from amongst a plurality of resource-utilising entities, wherein a resource-to-resource-utilising entity assignment has an associated cost, the method comprising:

computing network flow costs of assignments for assigning said resources to said resourceutilising entities;

constructing/updating a flow network including source nodes corresponding to the resources, transhipment nodes corresponding to the assignments and a demand node, the flow network having arcs representing flow between the nodes, each said arc having an associated said network flow cost;

computing said network flow cost of each said arc in accordance with at least one arc cost approximation scheme including a Random Neural Network approximation scheme;

solving a Minimum Cost Flow problem for the flow network with negated arc costs to obtain flow values for the assignments; and assigning said resource to said resource-utilising entity dependent on the flow value obtained for said assignment associated with said resource.

14. A computer program product comprising a non-transitory computer readable medium, the computer readable medium having thereon computer program code that, when loaded into a computer, causes the computer to execute the method according to claim 13.

15. A computing system having a processor coupled to a memory, the memory storing instructions that, when executed by the processor, cause the processor to execute the method of claim 13.

* * * * *